No. 817,898. PATENTED APR. 17, 1906.
M. BENJAMIN.
BEARING FOR GRINDING MILLS.
APPLICATION FILED OCT. 21, 1905.

2 SHEETS—SHEET 2.

UNITED STATES PATENT OFFICE.

MORRIS BENJAMIN, OF ATLANTA, GEORGIA.

BEARING FOR GRINDING-MILLS.

No. 817,898.  Specification of Letters Patent.  Patented April 17, 1906.

Application filed October 21, 1905. Serial No. 283,801.

*To all whom it may concern:*

Be it known that I, MORRIS BENJAMIN, a citizen of the United States, residing at Atlanta, in the county of Fulton and State of Georgia, have invented certain new and useful Improvements in Bearings for Grinding-Mills, of which the following is a specification.

In certain classes of shaft and spindle bearings where the spindle is vertical it has been found difficult to prevent the downward escape of the lubricant, which is not only wasted but in some cases injures the work or material below the bearing; and the object of my invention is to prevent such results, to which end I construct the bearing as fully set forth hereinafter and as illustrated in the accompanying drawings, in which—

Figure 1:
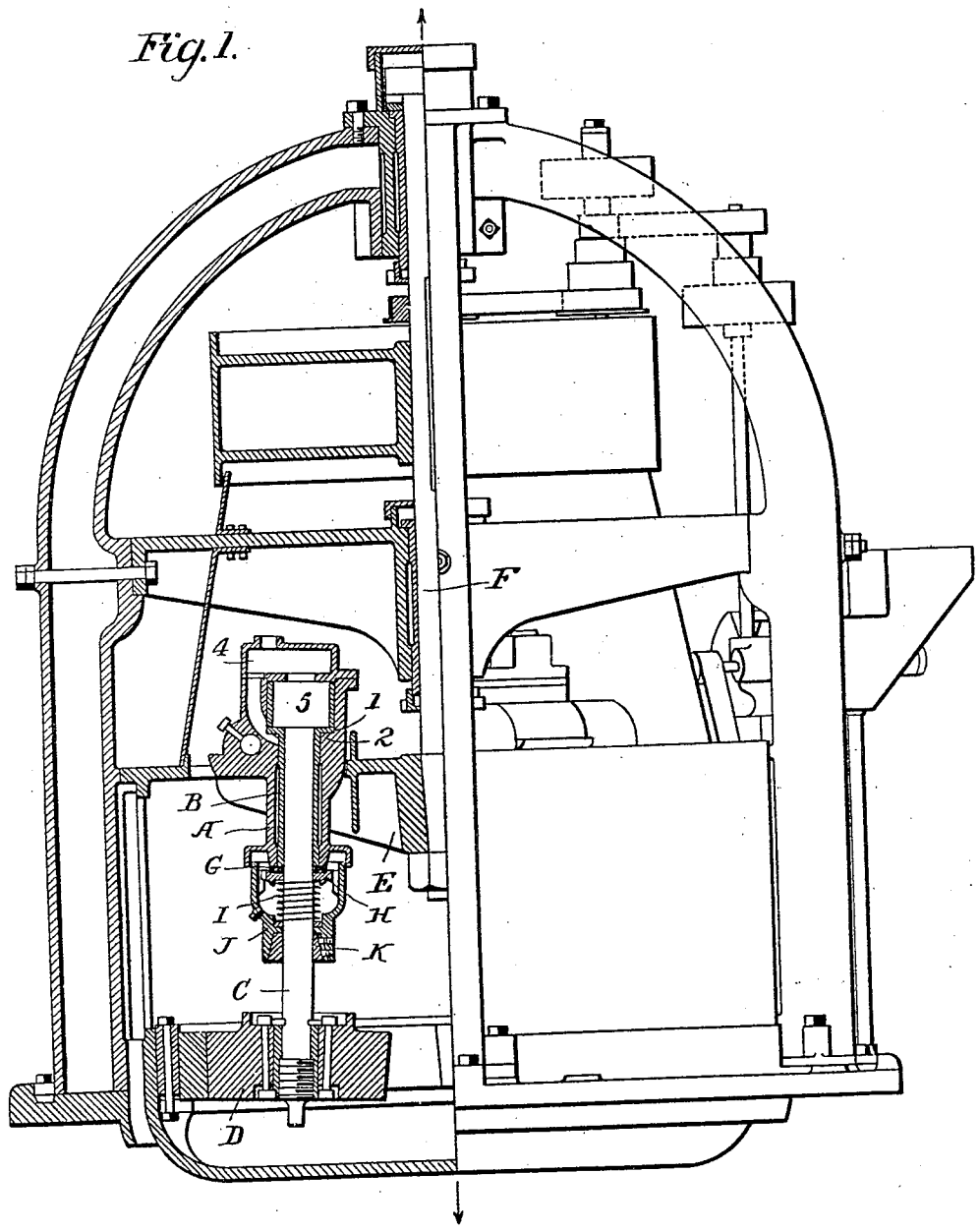
Figure 2:
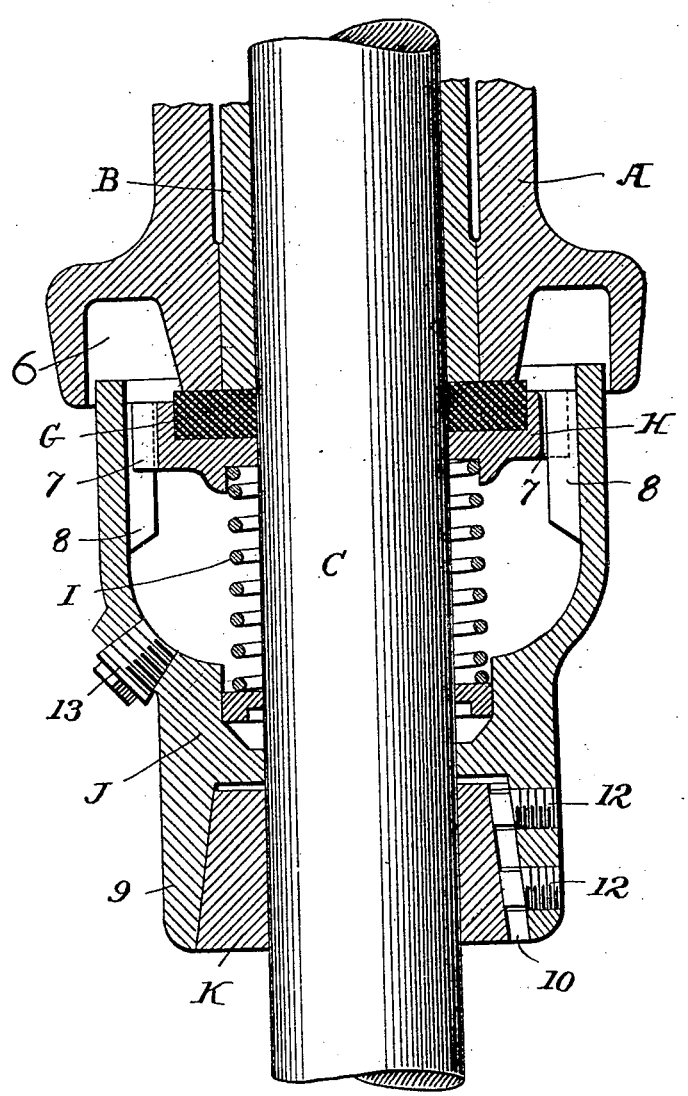

Figure 1 is a sectional elevation showing my improved shaft-bearing in connection with a grinding-mill. Fig. 2 is an enlarged section of the bearing itself.

The bearing is provided with a shell or box A, within which is the "brass" or sleeve B, having a flange 1, resting on a shoulder 2 of the box, and the upper portion of the box is formed to constitute a receptacle 4 for a suitable lubricant.

The shaft C turns in the sleeve B and has a head 5, which rests upon the flange 1, the shaft extending through the sleeve and below the box and being connected at the lower end with the part or device to be operated. This part will differ according to the character of the mechanism in which the bearing is employed. As shown, it is the roller D of a grinding-mill, in which the box A is pivoted to swing upon a revolving cross-head E, supported upon a rotating shaft F. To prevent the escape of the lubricant, which may flow down between the shaft and sleeve or between the latter and the box, I extend the end of the sleeve downward, so as to be flush with the end of the box, forming annular concentric flat faces, and against these bears the upper face of an annular packing G, of rubber or other suitable material, the inner face of which bears against the exterior of the shaft C. Any suitable means is employed to force the ring G against the end faces of the box and sleeve and the inner edge of the ring against the shaft, so that the joints between the sleeve and box and between the sleeve and shaft are effectually sealed.

As shown, the ring G fits a socket in an annular disk H, which is pressed upward by a spring I, surrounding the shaft and bearing at its lower end upon the shoulder of a "muff" or cup J, secured to the shaft, the upper edge of the muff extending into an annular recess 6 of the box, so as to aid in excluding dust and dirt.

It is essential that the packing rotate with the shaft, to which end it is seated in the disk H, and the latter has notches or bearings 7, adapted to contact with projections 8 of the cup J, so that the cup, shaft, and packing turn together. Where, as is common, the packing is stationary, the grit between the packing and shaft cuts the latter, so that it is difficult to maintain the sealing of the joint and to hold the packing in place. With the improved construction there is no cutting of the shaft and the packing always presses closely against the joints.

One means of securing the cup to the shaft is a sectional or split collar K, fitting externally a conical socket in the hub 9 of the cup, suitably bolted to the shaft, and with a vertical recess 10, receiving the ends of setscrews 12 12, passing through the side of the hub, so that the cup is compelled to rotate with the collar and shaft.

Near the bottom of the cup is an opening provided with a plug 13. The cup will receive any lubricant which may by any accident leak past the joints, and by removing the plug the contents of the cup can be withdrawn.

Without limiting myself to the precise construction and arrangement shown as to the application of the bearing to any particular class of machines, I claim—

1. The combination in a shaft-bearing and with a shaft of a box, a sleeve receiving the shaft and supported within the box, the box and sleeve having annular concentric flush faces, an annular packing, and means for pressing the same into contact with the said faces and with the face of the shaft, substantially as set forth.

2. The combination in a shaft-bearing and with a shaft of a box, a sleeve receiving the shaft and supported within the box, the box and sleeve having annular concentric flush faces, an annular packing, means for pressing the same into contact with the said faces and with the face of the shaft, and means for insuring the rotation of the packing with the shaft, substantially as set forth.

3. The combination in a shaft-bearing and with a shaft of a box, a sleeve receiving the shaft and supported within the box, the box and sleeve having annular concentric flush faces, an annular packing, a socketed disk carrying the packing, and means connecting the disk to turn with the shaft while permitting the disk to slide independently of the shaft, substantially as set forth.

4. The combination in a shaft-bearing and with a shaft of a box, a sleeve receiving the shaft and supported within the box, the box and sleeve having annular concentric flush faces, an annular packing, a socketed disk carrying the packing and connected to turn with the shaft, and a spring bearing against the disk and carrying the latter and the packing toward the box and sleeve, substantially as set forth.

5. The combination with the shaft, box, sleeve, and packing bearing against the ends of the box and sleeve, of the disk supporting the packing, a cup supported below the disk to turn with the shaft, and a spring interposed between the cup and disk, substantially as set forth.

6. The combination with the shaft, box, sleeve, and packing bearing against the ends of the box and sleeve, of the disk supporting the packing, a cup supported below the disk to turn with the shaft, and a spring interposed between the cup and disk, the cup provided with an outlet and detachable plug, substantially as set forth.

7. The combination with the shaft, box, sleeve, and packing bearing against the ends of the box and sleeve, of the disk supporting the packing, a cup supported below the disk to turn with the shaft, a spring interposed between the cup and disk, there being bearings on the cup and disk arranged to carry the disk rotatively with the cup while permitting the sliding of the disk, substantially as set forth.

8. The combination with the shaft, box, sleeve, and packing bearing against the ends of the box and sleeve, of the disk supporting the packing, a cup supported below the disk to turn with the shaft, and a spring interposed between the cup and disk, the box having an annular recess receiving the edge of the cup, substantially as set forth.

9. The combination with the shaft, box, sleeve, and packing bearing against the ends of the box and sleeve, of the disk supporting the packing, a cup supported below the disk to turn with the shaft, and a spring interposed between the cup and disk, the box having a socketed hub, and a conical or split collar secured to the shaft and fitting the socket of the cup-hub, substantially as set forth.

In testimony whereof I affix my signature in presence of two witnesses.

MORRIS BENJAMIN.

Witnesses:
JAMES F. SAUNDERS,
B. C. RUST.